April 20, 1965   J. D. HAGEN   3,179,462
EXPANDABLE TRAVEL TRAILER
Filed Nov. 6, 1962   4 Sheets-Sheet 1

INVENTOR.
John D. Hagen
BY

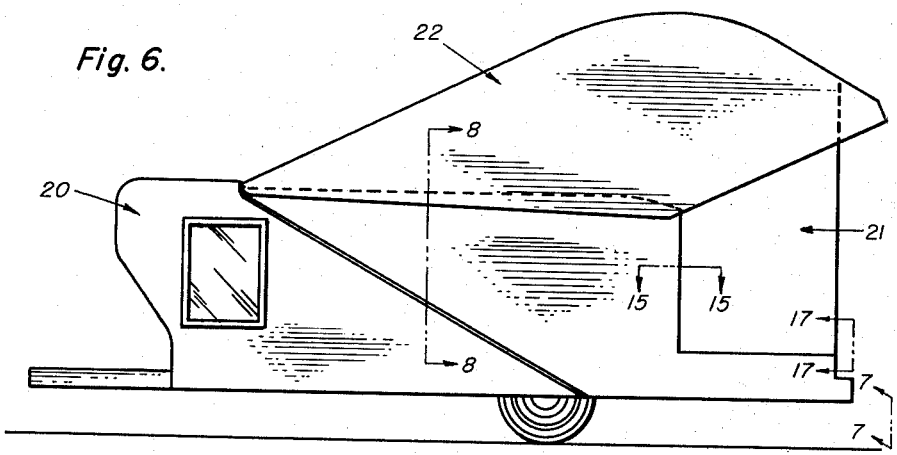
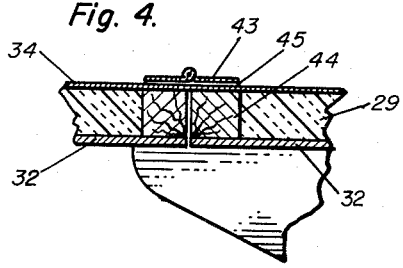
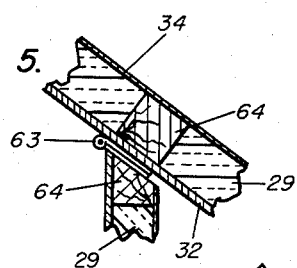
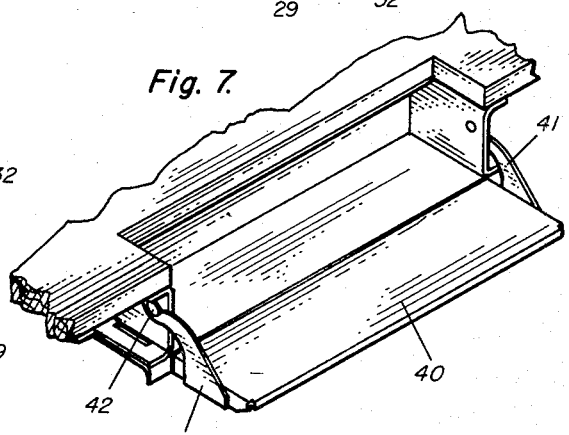
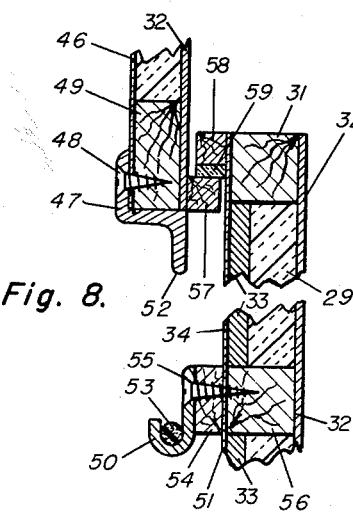

April 20, 1965     J. D. HAGEN     3,179,462
EXPANDABLE TRAVEL TRAILER
Filed Nov. 6, 1962     4 Sheets-Sheet 3
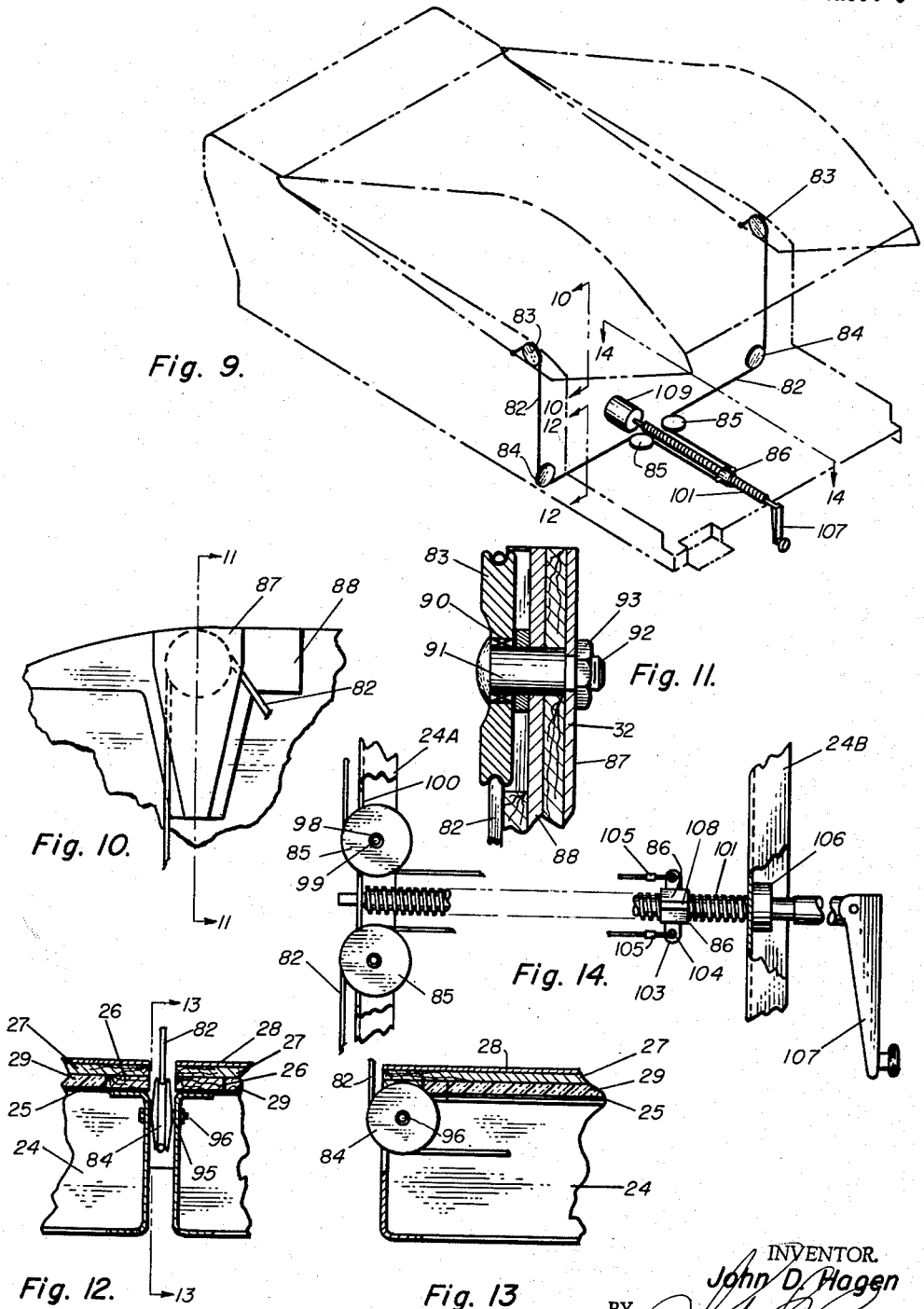
INVENTOR.
John D. Hagen
BY

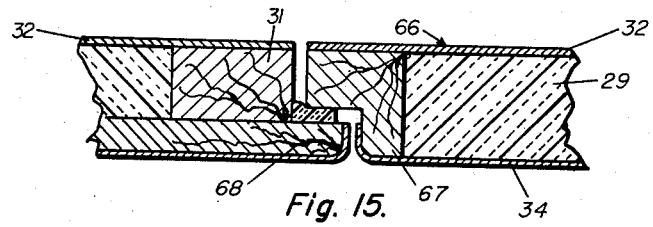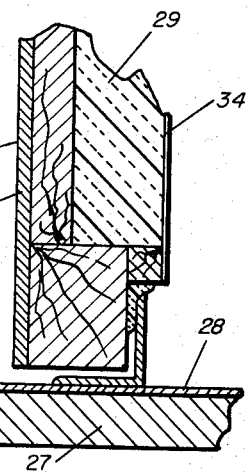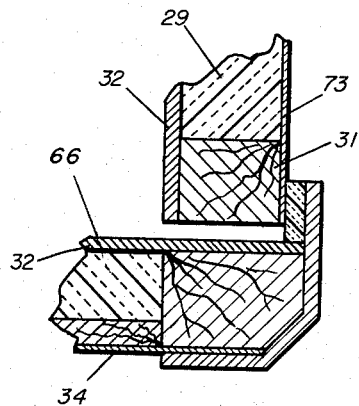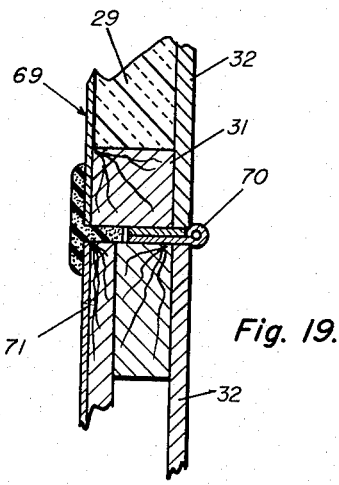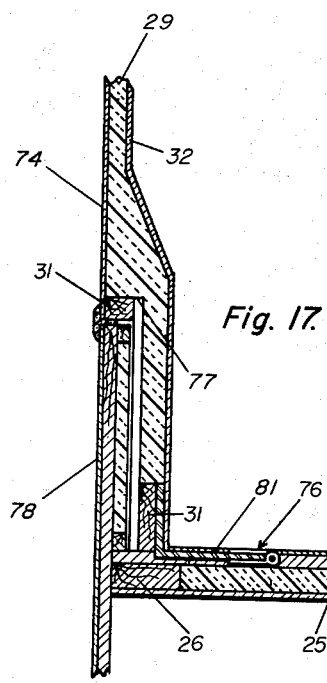

3,179,462
EXPANDABLE TRAVEL TRAILER
John D. Hagen, 4415 51st SW., Seattle, Wash.
Filed Nov. 6, 1962, Ser. No. 235,742
3 Claims. (Cl. 296—23)

This invention relates generally to movable dwelling trailers, and more particularly to an expandable type trailer that has the normal facilities of a house trailer when expanded but when collapsed is of a smaller size.

In the past various "camper" trailers of an expandable nature have become known but have had various limitations and difficulties. The "camper" type trailer has been smaller and not so well furnished as the "house" trailer. The expandable construction feature has been necessitated the use of canvas or some similar fabric-like material with attendant problems of physical rigidity and durability. Where panel-type construction has been used, the panel motion involved has often times been unduly complex, costly and not durable. The panels in the collapsed condition have impaired the use of the floor space and equipment arrangement. Thus facilities in the "camper" type trailer have not been so extensive or of the standard types used in the "house" type trailer.

The instant invention seeks to provide a collapsible trailer having the advantages of the "camper" variety and yet the size and convenience of the "house" variety. To accomplish these ends:

It is a principal object of my invention to create a novel and useful improvement in expandable travel trailers of the 12 to 20 foot length class.

It is another principal object of my invention to provide a trailer of approximately the same length, height, roadability and pleasing appearance on the road as the modern American automobile, which still has the facilities to provide the livability of conventional trailers.

Another principal object of my invention is to provide a trailer as aforesaid which uses the same interior equipment, or that substantially the same, as used in conventional "house" trailers.

Another object of my invention is to provide such a trailer at a lower cost than conventional trailers by reason of its simplicity, completely finished sub-assemblies, and reduced labor coats in major assemblies and finishing.

Another object of my invention is to provide entrance and space for housing a conventional car-top boat inside the trailer, when in a collapsed condition.

It is another object of my invention to provide an expandable trailer with adequate head-room and facilities, that yet may be readily collapsed for road use with a volume to weight ratio and center of gravity lower than conventional trailers, to make for greater stability, roadability, and safety—comparable to other types of vehicles used on highways.

For further comprehension of my invention and the objects and advantages thereof, reference is now made to the following specification and accompanying drawings and reduced labor costs in major assemblies and finishing. of the invention are more particularly set forth.

In the accompanying drawings, which form a part of the specification, and in which like numbers of reference refer to similar parts throughout:

FIGURE 4 is a partial cross sectional view of the top hinge, taken on the line 4—4 of FIGURE 2 in the direction indicated by the arrows thereon.

FIGURE 5 is a partial cross sectional view showing the hinged connection between the rear panel and the top, taken on the line 5—5 of FIGURE 2 in the direction indicated by the arrows thereon.

FIGURE 6 is an orthographic side view of my invention showing it raised, assembled and ready for use.

FIGURE 7 is a partial isometric view of the back step of my invention showing its configuration and construction.

FIGURE 8 is a partial cross sectional view showing the detail of the joining structure between the top and side walls of my trailer taken on the line 8—8 of FIGURE 6 in the direction indicated by the arrows thereon.

FIGURE 9 is an isometric diagrammatic view of the cable raising system of my invention showing the details thereof.

FIGURE 10 is a partial planar view of the upper body pulley showing its support in the wall member, taken on the line 10—10 of FIGURE 9 in the direction indicated by the arrows thereon.

FIGURE 11 is a cross sectional view of the same pulley taken at right angles to that of FIGURE 10, on the line 11—11 of FIGURE 10 in the direction indicated by the arrows thereon.

FIGURE 12 is a partial cross sectional view of the lower body pulley taken on the line 12—12 of FIGURE 9 in the direction indicated by the arrows thereon.

FIGURE 13 is a partial cross sectional view of the same lower body pulley as FIGURE 12 taken on a plane perpendicular to that of FIGURE 12, along the line 13—13 of FIGURE 12 in the direction indicated by the arrows thereon.

FIGURE 14 is a partial surface view of the screw raising member of my invention showing its construction and operation with the screw cable pulleys, taken on the line 14—14 of FIGURE 9 in the direction indicated by the arrows thereon.

FIGURE 15 is a cross sectional view of the joining edge of the side panels, taken on the line 15—15 of FIGURE 6 in the direction indicated by the arrows thereon.

FIGURE 16 is a cross sectional view of the joining edge between the rear panel and floor, taken on the line 16—16 of FIGURE 3 in the direction indicated by the arrows thereon.

FIGURE 17 is a cross sectional view of the joining edge between the left rear panel and the trailer body, taken on the line 17—17 of FIGURE 6 in the direction indicated by the arrows thereon.

FIGURE 18 is a cross sectional view of the joint between the side and rear panels, taken on the line 18—18 of FIGURE 3 in the direction indicated by the arrows thereon.

FIGURE 19 is a cross sectional view of the joint between the right side panel and floor, taken on the line 19—19 of FIGURE 3 in the direction indicated by the arrows thereon.

Figure 1:
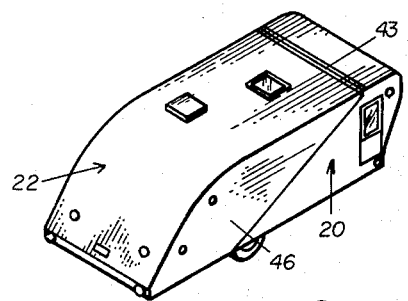
FIGURE 1 is a isometric view of the closed trailer from a point above, to the side and rearward.
Figure 2:
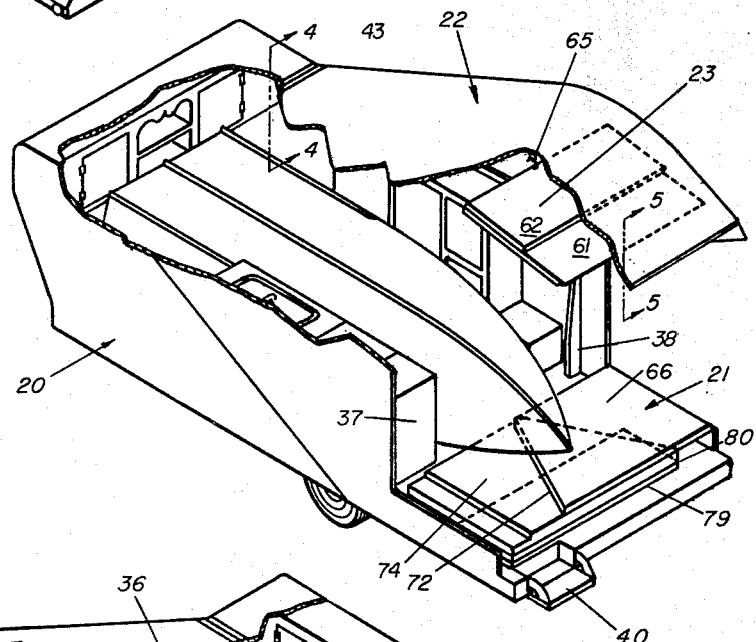
FIGURE 2 is a partially cut-away isometric view of my trailer, expanded, showing how a boat will fit therein and how the interior apportionments are arranged.
Figure 3:
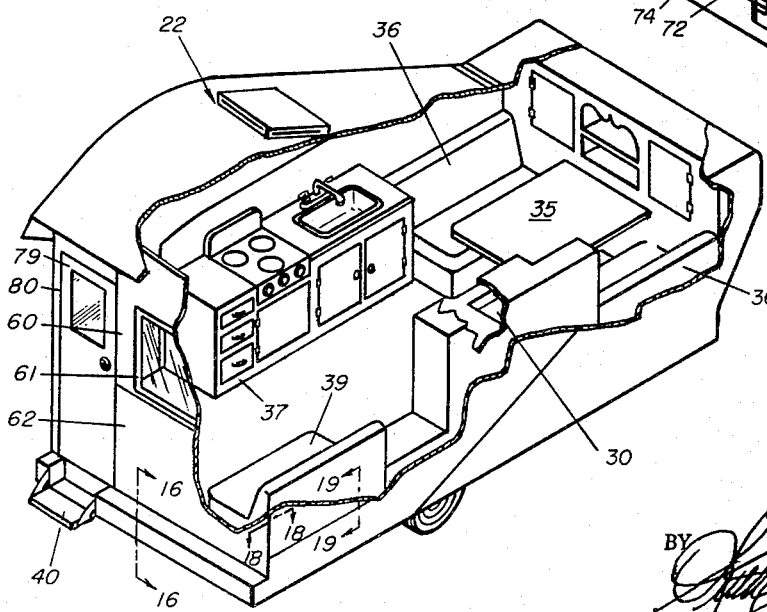
FIGURE 3 is a partially cut-away isometric view of the side opposite that of FIGURE 2, showing the arrangement of cabinets and apportionments therein.

Referring now to the drawings in more detail, and particularly to those of FIGURES 1, 2, and 3, it will be seen that my trailer consists essentially of a rigid body portion 20 hingeably supporting two rearward body side members 21 on each side and a movable top portion 22, which itself hingeably supports a folding rear panel 23. These various members, when collapsed, form the configuration of a trailer as illustrated in FIGURE 1, approximately the size and shape of an ordinary automobile with somewhat similar physical characteristics, at least as far as roadability be concerned. Said members are, however, expandable into the regularly functional house trailer illustrated in FIGURES 2 and 3.

The body portion 20 of my invention is formed substantially to the configuration illustrated by conventional means well known in the trailer art. I prefer to construct the under-structure from fairly deep rolled-channel members 24 of a depth of some 4 inches or so, the various pieces of the under structure being joined to each other by welding. Immediately on the upper side of the channel 24 is a thin continuous sheet of aluminum 25 and immediately over the upper web of each channel 24 is a wood stringer 26, preferably of a thickness of some ¾ of an inch. On top of the wood stringers 26 is a piece of plywood 27 of a thickness of preferably ⅝ of an inch and on top of this is placed the finished floor 28, most generally a relatively thin tile or linoleum. In the space between the aluminum sheet 25 and plywood floor 27 I place a vapor barrier and insulation 29 of a relatively high "R" type to prevent excessive heat conductivity through the floor member.

The deep channel type construction of the floor is preferred for rigidity and so that the foot well 30 under the eating table may be provided without creating an excessive downward projection at the forward portion of the trailer. This foot well 30 may be provided for by appropriately spacing the channel members 24, and positioning the finished floor 27, 28 along the lower-most webs, as well known in the art.

The side wall construction of my trailer is best shown in the cross sectional view of FIGURE 8. The framework is formed from wooden structural members 31, preferably of approximately a ¾ inch thickness. These members carry on their interior the eighth inch plywood 32, forming a finished interior surface and on their exterior the ⅜ inch plywood panels 33 covered with the aluminum or fiberglass skin 34. The various members are joined with glue and screw nails by methods well known in the art.

The arrangement of cabinets and interior apportionments is reasonably strict and should be substantially as illustrated in FIGURES 2 and 3. The table 35 and benches 36 are best positioned in the forwardmost portion of the trailer, as illustrated, so that the foot-well 30 thereunder will be at the forward portion of the trailer. The drawer cabinet 37 should be positioned as shown at the rearwardmost portion of the side member of the body 20 so as to provide lateral rigidity for the trailer wall thereabout and to better support the upper body pulley 83 thereabove. Similarly the interior buttress 38 is provided on the opposite wall at the end of the movable couch 39 to give added rigidity to the wall on this side. The remaining apportionments are of standard design and size and are for greatest convenience and appropriate head-room arranged as illustrated.

The back step 40 is detailed in the drawing of FIGURE 7. It is held in its lowered position by engagement of the hook 41 with the side pins 42 as illustrated. When the step is folded up from operating position it will enclose the rearward opening, to present a solid rearward dust free closure for the trailer body.

The axle, wheel, and hitch members of my trailer and the other external fixtures are standard items of commerce and well known in the trailer arts.

The movable top portion 22 of my invention is formed substantially to the shape illustrated in the drawings, based on a construction similar to that heretofore described for the side wall except for the absence of the plywood on the exterior. Wooden structural members 31 carry on their inner surface the interior finished plywood 32 and on the exterior surface the aluminum or fiberglass skin 34. This top member 22 is hingeably supported by the body member 20 by means of the piano type hinge 43, as best illustrated in FIGURE 4 of the accompanying drawings. A structural cross member 44 is provided parallel to and immediately adjacent the meeting edges of the top 22 and the body 20 to provide a rigid means for attachment of the piano hinge 43. An elongate relatively narrow strip of weather proofing material 45, preferably vinyl or neoprene, is provided under the hinge 43 to weather proof the joint between the two members and prevent any seepage therethrough.

The shape of the top member 22 is relatively critical. It must be such as to present a smooth planar top surface as illustrated in FIGURE 1, when in its collapsed position, and yet must be expandable, as illustrated, to fit over the other expanded portions of the trailer and provide sufficient headroom for normal activities therein. To accomplish this, it is necessary to have the hood raised to a position in which the upper planar surface will make an angle of substantially 25 degrees with a horizontal plane passing through the uppermost surface of the rigid body portion 20; the rearward portion of the top member 22 will require such a downward curve as will allow it to fit against the upper surface of the rear panel. Maximum efficiency in a design of this nature seems to require trailers from lengths substantially between 12 and 20 feet to prevent excessive waste space and to accommodate standard sized components of commerce.

The sealing of the top member against the side member 21 is best illustrated in the cross sectional view of FIGURE 8. The lower edge of the sides 46 of the top member 22 are provided with a Z mold 47 of a nature illustrated. This mold 47 is attached by screws 48 affixed in the structural member 49 carried along the periphery of the lower side edges. A mating U-shaped mold 50 is provided on the exterior surface of the body sides 51 to receive the downwardly projecting edge 52 of the Z mold 47. The inner portion of the U mold 50 is provided with a sealer strip 53 of substantially circular cross section and of a reasonably elastic deformable nature, again preferably vinyl or sponge rubber. A spacing block 54 must be provided between the U-shaped mold 50 and the body side 51 to provide sufficient clearance between the top member 22 and side member 21 and allow the edge 52 of the Z mold to come to rest within the groove of the U mold 50. Again the U mold is fastened to the spacing block 54 by screws 55 and it is preferably backed by a structural member 56 within the body side 51. It will be noted that the U mold 50 must be angularly disposed to the horizontal along the body side 51 to accomplish its purpose in sealing the joint between the top member 22 and the body portion 21.

When raised, sealing blocks must be provided between the side 21 and top members 22 to seal the joint therebetween. An elongate internally projecting block 57 is provided on the inner surface of the side portion of the top member 22 and a similar externally projecting block 58 is provided on the upper outer surface of the body side 51. The block 58 carries on its lower surface a deformable elastic sealing member 59, preferably of sponge rubber, to readily seal the joint between the blocks. When the top member 22 is raised sufficiently, the sealing block 57 will come into contact with the sealing member 59 carried by the block 58 to cause a seal therebetween.

The rear panel 23 is hingeably supported by the under surface of the top member 22. This member 23 is of a rectangular configuration comprising two halves hingeably communicating with each other by means of a piano hinge. The upper portion 60 has in it the pre-formed window 61 of standard construction. The uppermost edge of the upper portion 60 is hingeably supported by the lower surface of the top member 22, as illustrated best in the cross sectional view of FIGURE 5. The piano type hinge 63 communicates between the two members 22, 23 and is preferably fastened to a structural member 64 provided in each to support the hinge 63. The upper surface of the member 64 in the upper portion 60 of the rear panel must be shaped substantially as illustrated to provide a tight fit. The lower portion 62 of the rear member 23 is hinged on the inner surface so that it folds back against the inner surface of the upper portion 60, and the upper portion 60 then is adapted to fold upwardly against the lower surface of the top member 22 and may be held thereagainst by means of the snap 65 communicating between said members.

It is to be noted that the door in the rear of the trailer is not carried or supported by the rear panel 23.

A weather-tight fit of a type well known in the trailer art should be provided between the lowermost edge of the lower panel 62 and the upper surface of the floor 28, as illustrated in FIGURE 16.

The rearward right side panel 66 is a rectangular member of structure similar to that described for the movable top 22. The forward edge 67 is adapted to meet in a weather-tight seal with the rearward edge 68 of the body side. The lowermost edge 69 is hingeably supported by the piano-type hinge 70 on the upward projection 71 of the body member 20. The hinged connection between the lower edge 69 and the body member 20 must be above the floor level so that this side panel 66 will overlay the left side panel 74 and be supported by it as illustrated in FIGURE 2. The upper edge 72 and rearward edge 73 again should be such as to provide a substantially weather-tight seal between this member and the other members abutting thereagainst.

The rearward left side panel 74 is also of a structure similar to that heretofore described for the movable top portion 22. This member 74 likewise must have edges adapted to form a weather-tight seal with adjacent panels as shown in the cross sectional view of FIGURE 15. The lower portion of the left side panel 74 must be constructed with an appropriate recess 77 to allow it to fit about the short upwardly projecting wall 78 of the body member 20 as best shown in the cross sectional view of FIGURE 17. The panel 74 carries at its rearward portion the ordinary door of commerce 79, hingeably supported along the edge 80, again by a piano type hinge allowing said door to open inward.

The lowermost portion of the left panel 74 carries the perpendicularly inwardly projecting foot 81, rigidly attached to the bottom of said member. The innermost projecting edge of this foot 81 is hingeably connected to the upper surface of the floor 28 to allow rotation of the entire member 74. An appropriate recess 76 is preferably constructed in the floor 28, so that the foot 81 will not project upwardly above the general surface of the floor. This structure will best be seen in the cross-sectional detail view of FIGURE 17. The structure is necessitated by reason of the arrangement of other parts to allow the side panel to properly fold as hereinafter described.

The lifting mechanism of my invention is best shown in the illustration of FIGURE 9 and the detail diagrams following. A cable 82 is rigidly attached to the lowermost surface of the movable top 22, and passes over the upper body pulley 83, thence over the lower body pulley 84, over the screw pulley 85 and is rigidly attached at its other end to the screw sleeve 86. A similar cable structure and support system is provided on each side of my invention, one the mirror image of the other, so that the two sides of the top member 22 may be raised simultaneously.

The upper pulley structure is detailed in a side view of FIGURE 10. Additional rigidity is provided in the trailer wall by the fish-plate 87, shaped substantially as illustrated, preferably from aluminum sheet. It is held in position in the wall member preferably by solid wooden blocking 88, the various members structurally communicating by way of bolts passing therethrough.

The pulley 83 carries the internal bearing 90 which rotates upon the stud axle 91 held in position in the trailer wall by the headed bolt 92 in cooperation with the internal nut 93. From this structure it will be seen that the upper body pulley 83 is free to rotate upon the stationary stud axle 91. The trailer wall immediately adjacent the pulley is provided with additional physical rigidity by the fish plate 87 and additional lateral rigidity is given on the right side by the cabinet 37, and on the left side by the interior buttress 38.

The lower body pulley 84 is detailed in the cross sectional views of FIGURES 12 and 13. Here the pulley 84 is supported on the axle 95 carried on the bolt 96 between two appropriately positioned channel members 24. Both the lower body pulley 84 and upper body pulley 83 must be positioned so that the cable 82 carried thereover will be on the outside of the outermost surface of the side wall of the body 20 and free to move thereover. This will necessitate the milling of somewhat of a recess in the understructure of the floor as illustrated in FIGURE 12 and 13.

The screw pulleys 85 are carried on the axles 98 in turn supported upon the bolts 99 in the channel member 24A. An appropriate recess 100 will have to be provided in the channel 24A and other appropriate recesses provided in the various structural channel members 24 to provide free rotation of the pulleys and free movement of the cable 82 therebetween.

The raising screw is illustrated in FIGURE 14. For this member I prefer to use an ordinary one-inch square threaded screw 101 of ordinary commerce, preferably one having a fairly shallow thread, of some 2 or 3 pitch, so that friction in the screw will prevent any gravity motivated movement in the top member 22. The screw 101 carries the threadedly engaged collar 86 having the diametrically opposed projecting yokes 103 with holes 104 therein adapted to receive the ends of the cables 82. I prefer to fasten the cables 82 to the yokes 103 by an adjustable fastener 105, of a type well known in commerce, to provide for any possible necessary adjustment in cable length. The screw 101 is positioned rotatably and substantially perpendicularly between two appropriately positioned cross supports 24A and 24B. A thrust bearing 106 is provided at the rearward portion of the screw 101 and rigidly fastened to the rearward cross support 24B to prevent any lengthwise movement of the screw 101 relative to the cross supports 24A, 24B. A removable handle 107 is provided at the rearward portion of the screw 101, and the screw is preferably so positioned that this handle projects beyond the rearwardmost surface of the trailer body 20 to provide for easy turning. The upper surface of the collar 86 carries an upwardly projecting dog 108 adapted to run in a channel (not shown) on the under surface of the trailer floor, so that when the screw 101 be turned the collar 86 must move relative thereto.

From this structure it will readily be seen that as the collar 86 moves rearward upon the screw 101, the cable 82 will be moved in such fashion as to cause the top member 22 to raise to its upward extended position.

In operation, to expand my trailer from the non-expanded condition illustrated in FIGURE 1, the screw 101 is activated to move the collar 86 rearwardly thereover, thus causing the top member 22 to raise to its expanded position. The rearward right side panel 66 is then lifted outwardly to its assembled position and the rearward left side panel 74 is lifted upwardly. The rear panel 23 is then released from its position against the underside of the top member 22 and folded down into assembled position. The door 79 is then moved approximately 90 degrees to its final closed position. The couch 39, which had to be moved to the interior aisle space to fold the trailer, is then repositioned as illustrated in FIGURE 3 and the trailer is in a liveable, operable condition.

To collapse the trailer for road driving, it is merely necessary to reverse the foregoing steps.

A small 6 or 12 volt motor 109 may be added to communicate with the end of the screw 101, with appropriate controls (not shown), to mechanically activate the screw 101, if this be desired. With a screw 101 of sufficiently long pitch, I have not found it necessary to provide mechanical stop means to prevent unwanted movement of the top 22, but this could be done if desired. It should be noted, however, that no downward movement of the top 22 could occur when the rearward side panels 66, 74 are in assembled position. It is also to be noted that when the trailer be disassembled, the couch 39 is positioned in the center aisle and this will leave sufficient space to position an ordinary car-top boat of commerce thereover as illustrated in FIGURE 2.

The foregoing description is necessarily of a detailed specific character so that the specific embodiment of the simplest case of my invention may be clearly set forth. It is to be understood that various rearrangements of parts, multiplication thereof and modifications of detail may be resorted to in connection with the invention without departing from its spirit, essence, or scope.

Having thusly described my invention, what I desire to protect by Letters Patent, and, what I claim is:

1. An expandable trailer of the nature aforesaid, comprising, in combination, a boxlike body portion, having a floor with a lowered footwell in the central forward portion thereof, supported upon a rigid wheel carrying frame with an upwardly extending forward wall and two similar upwardly extending forward side walls communicating therewith, said floor portion extending rearwardly beyond the rearward extension of the forward said walls; a hollow wedge shaped top with the apex hingeably communicating with the forward wall near its upper portion, said top having a rearward downwardly curving, laterally extending upper surface and side walls adapted to moveably fit over the paired opposed forward side walls of the body member, with a folding downwardly extending rigid rear panel hingeably attached to the rearward part of the underside of the top member, adapted to be releasably supported thereby in a collapsed condition and downwardly extensible therefrom in an expanded condition, said top being so designed as to present an upper streamlined surface substantially no higher than the forward body wall when collapsed and to give sufficient headroom to allow occupants to stand and perform normal functions within the trailer enclosure when the top be raised to its expanded position; a first rearward side member having a laterally extending L-shaped bracket structurally communicating with the lowermost surface thereof, the innermost edge of said bracket being hingeably supported by the floor of said trailer and the rearwardly extending edge of the panel hingeably supporting an inwardly opening door normally positioned perpendicular to said panel when closed, the whole assembly being adapted to fold, with the door against the first rearward side member on its underside, downwardly, adjacent to and substantially parallel with the trailer floor; a second rearward side member hingeably supported by a short upwardly projecting side wall immediately rearward of the forward side wall of the body member, adapted to fold outwardly to enclose the space between the lateral edge of the forward side member and the back member when expanded and to fold downwardly against the first rearward side member when collapsed; a table with accompanying benches arranged in the central forward portion of the trailer enclosure over the footwell to provide appropriate access thereto and cabinets, no higher than the forward side walls, along the inner sides thereof to provide access thereto and additional rigidity to the forward side walls; and a cable system adapted to raise and lower the rearward portion of the top member, comprising two laterally paired systems each having an upper body pulley attached near the upper rearward portion of the forward body side member, a lower body pulley on the lowermost part of the forward body side member substantially vertically below the upper body pulley and a screw pulley journaled in the underframe of the trailer structure with cables passing over each pulley system, one cable communicating from the lowermost rearward edge of each side of the top member to a collar carried by a screw member adapted to cause equal linear movement in each cable parallel to the screw motion to raise or lower the top member in response to appropriate rotary motion of the screw member.

2. The invention of claim 1 having structural means of strengthening and adding rigidity to the rearward portion of the forward trailer walls immediately supporting the upper body pulleys, said means including a buttress-like structure on the inner surface of said wall.

3. An expandable trailer of the nature aforesaid, comprising, in combination, a box-like body portion, having a floor with a lowered footwell in the central forward portion thereof, supported upon a rigid wheel carrying frame with an upwardly extending forward wall and two similar upwardly extending forward side walls communicating therewith, said floor portion extending rearwardly beyond the rearward extension of the forward side walls; a hollow wedge shaped top with the apex hingeably communicating with the forward wall near its upper portion, said top having a rearward downwardly curving, laterally extending upper surface and side walls adapted to moveably fit over the paired opposed forward side walls of the body member, with a folding downwardly extending rigid rear panel hingeably attached to the rearward part of the underside of the top member, adapted to be releaseably supported thereby in a collapsed condition and downwardly extensible therefrom in an expanded condition, said top being so designed as to present an upper streamlined surface substantially no higher than the forward body wall when collapsed and to give sufficient headroom to allow occupants to stand and perform normal functions within the trailer enclosure when the top be raised to its expanded position; a first rearward side member having a laterally extending L-shaped bracket structurally communicating with the lowermost surface thereof, the innermost edge of said bracket being hingeably supported by the floor of said trailer and the rearwardly extending edge of the panel hingeably supporting an inwardly opening door normally positioned perpendicular to said panel when closed, the whole assembly being adapted to fold, with the door against the first rearward side member on its underside, downwardly, adjacent to and substantially parallel with the trailer floor; a second rearward side member hingeably supported by a short upwardly projecting side wall immediately rearward of the forward side wall of the body member, adapted to fold outwardly to enclose the space between the lateral edge of the forward side member and the back member when expanded and to fold downwardly against the first rearward side member when collapsed; a table with accompanying benches arranged in the central forward portion of the trailer enclosure over the footwell to provide appropriate access thereto and cabinets, no higher than the forward side walls, along the inner sides thereof to provide access thereto and additional rigidity to the forward side walls.

References Cited by the Examiner

UNITED STATES PATENTS

| 1,864,047 | 6/32 | Lawhorne | 296—23 |
| 2,582,635 | 1/52 | Kipple | 296—23 |
| 2,920,919 | 1/60 | Spencer | 296—23 |

FOREIGN PATENTS

| 271,388 | 5/27 | Great Britain. |

A. HARRY LEVY, *Primary Examiner.*